(No Model.)

H. S. BACON.
METAL BANDING DEVICE.

No. 565,664. Patented Aug. 11, 1896.

Witnesses:
Walter E. Lombard.
M. E. Bonditch

Inventor:
Henry S. Bacon
per T. W. Porter Atty

UNITED STATES PATENT OFFICE.

HENRY S. BACON, OF WORCESTER, MASSACHUSETTS.

METAL-BANDING DEVICE.

SPECIFICATION forming part of Letters Patent No. 565,664, dated August 11, 1896.

Application filed November 22, 1895. Serial No. 569,828. (No model.)

*To all whom it may concern:*

Be it known that I, HENRY S. BACON, of Worcester, in the county of Worcester and State of Massachusetts, have invented a new and useful Improvement in Metal-Banding Devices, which will, in connection with the accompanying drawings, be hereinafter fully described, and specifically defined in the appended claim.

Figure 1:
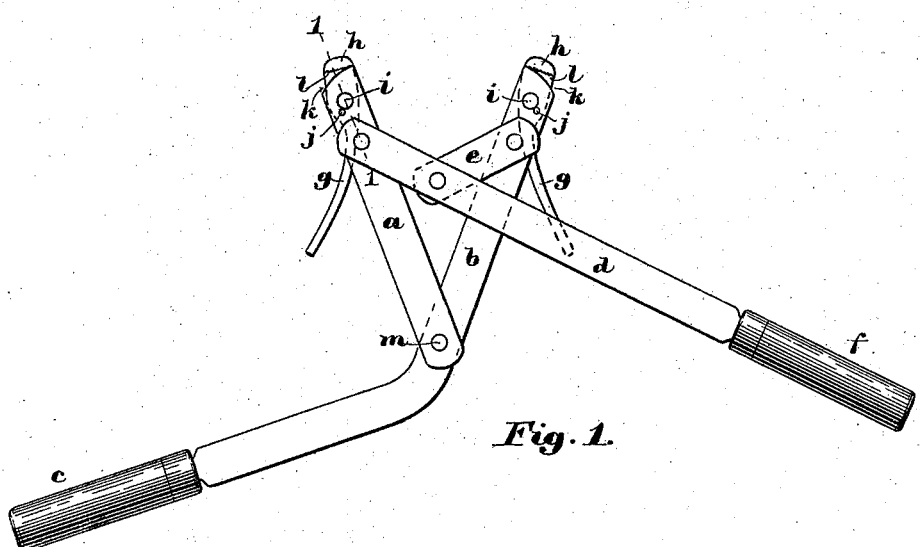
Figure 2:
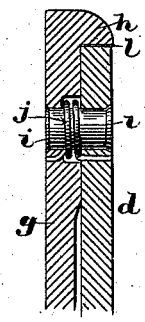

In said drawings, Figure 1 is a side view of my improved metal-banding implement; and Fig. 2 is a section, as on line Z, Fig. 1, showing the elastic device for actuating the grips.

The object of this invention is to add certain improvements to the metal-clamping device patented to me on July 12, 1887, by United States Letters Patent No. 366,293, to which reference is to be had; and the invention consists in certain improvements in the wire-gripping devices by which the wire is held while being brought to the requisite tension, and in certain improvements in the means by which the implement is held and actuated, as will be next pointed out, and then stated in the claim.

Referring again to said drawings, $a$ and $b$ represent the two arms of the implement, the two being united by pivot $m$. A lever $d$ is pivoted to $a$ and it is provided with a handle $f$, and to said lever, as also to arm $b$, is pivoted the link $e$, as shown. Arm $b$ is bent near pivot $m$ to give it a desired angle relatively to lever $d$, and it is extended beyond the bend and is provided with handle $c$, as shown.

The grips $g$ are pivoted to arms $a\,b$ at $i$, and they are formed with a lip $h$, that extends across the face of said arms, said lips being formed with teeth (shown at $l$) that are perpendicular to said arms, as shown in Fig. 1.

The ends $k$ of arms $a\,b$ are cut oblique to lip $h$, as shown, so that as the wire or ribbon is gripped between the two the greatest pressure thereon will be at the inner edge of said arms, and the contact with such ribbon will gradually cease as such gripping contact diminishes toward the outer edge of said arms.

A coiled spring $j$ is seated on pivots $i$ in a counterbore in the arms, and the ends of said springs are respectively secured in arms $a\,b$ and grips $g$, as shown, so as to close the grips upon the ribbon when they are liberated.

Having thus described my invention, what I claim as new, and desire to secure by Letters Patent, is—

In a metal-banding implement, the combination of levers $b$ and $d$ provided with suitable handles, the lever $a$ pivoted to lever $b$ and having lever $d$ pivotally united with it, and the short link $e$ pivotally uniting levers $b$ and $d$, the grips arranged on levers $a$ and $b$ and provided with pivots $i$, and the coiled spring $j$ arranged on said pivots and with their ends anchored to the lever and grips substantially as specified.

HENRY S. BACON.

Witnesses:
T. W. PORTER,
A. F. STOWE.